US012490940B2

(12) United States Patent
Ueda et al.

(10) Patent No.: US 12,490,940 B2
(45) Date of Patent: Dec. 9, 2025

(54) PHYSIOLOGICAL PARAMETER CALCULATION DEVICE AND NON-TRANSITORY COMPUTER-READABLE MEDIUM

(71) Applicant: NIHON KOHDEN CORPORATION, Tokyo (JP)

(72) Inventors: Yoshinori Ueda, Tokorozawa (JP); Yoshiharu Harada, Tokorozawa (JP); Tetsuo Suzuki, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 809 days.

(21) Appl. No.: 17/488,713

(22) Filed: Sep. 29, 2021

(65) Prior Publication Data

US 2022/0096018 A1 Mar. 31, 2022

(30) Foreign Application Priority Data

Sep. 30, 2020 (JP) ................. 2020-166154

(51) Int. Cl.
*A61B 5/00* (2006.01)
*A61B 5/1455* (2006.01)
*G16H 40/63* (2018.01)

(52) U.S. Cl.
CPC ........ *A61B 5/7221* (2013.01); *A61B 5/14552* (2013.01); *G16H 40/63* (2018.01); *A61B 2562/0238* (2013.01); *A61B 2562/04* (2013.01)

(58) Field of Classification Search
CPC .......... A61B 5/7221; A61B 2562/0238; A61B 2562/04; G06F 2119/02; G16H 40/63
See application file for complete search history.

(56) References Cited

U.S. PATENT DOCUMENTS 4,577,639 A 3/1986 Simon et al.
4,577,693 A 3/1986 Graser
(Continued)

FOREIGN PATENT DOCUMENTS

EP 0 182 197 A2 5/1986
JP 61-115537 A 6/1986
(Continued)

OTHER PUBLICATIONS

Extended European Search Report dated Feb. 24, 2022, issued by the European Patent Office in counterpart European Patent Application No. 21199428.0.
(Continued)

*Primary Examiner* — Charles A Marmor, II
(74) *Attorney, Agent, or Firm* — Sughrue Mion, PLLC

(57) ABSTRACT

A physiological parameter calculation device includes an acquiring section, a failure sensing section and a calculation section. The acquiring section acquires a plurality of signals corresponding to physiological information of a subject. The failure sensing section senses a failure of the plurality of elements. The calculation section calculates a physiological parameter based on the plurality of signals acquired by the acquiring section and a first algorithm or a second algorithm. The calculation section calculates the physiological parameter: based on the first algorithm when the failure sensing section does not sense a failure in an element for acquiring a signal used for the first algorithm among the plurality of elements, and based on the second algorithm when the failure sensing senses that a failure occurs in an element for acquiring a signal used for the first algorithm among the plurality of elements.

5 Claims, 5 Drawing Sheets

(56) References Cited

U.S. PATENT DOCUMENTS

| | | | |
|---|---|---|---|
| 5,356,593 A | | 10/1994 | Heiberger et al. |
| 7,120,480 B2 * | | 10/2006 | Chew ................. A61B 5/14552 |
| | | | 600/323 |
| 2002/0035334 A1 | | 3/2002 | Meij et al. |
| 2004/0267140 A1 | | 12/2004 | Ito et al. |
| 2012/0220841 A1 | | 8/2012 | Li |
| 2012/0253151 A1 | | 10/2012 | Lisogurski et al. |
| 2015/0272488 A1 * | | 10/2015 | Ueda .................... A61B 5/7405 |
| | | | 600/322 |
| 2018/0160506 A1 * | | 6/2018 | Tsai ....................... H05B 45/58 |
| 2019/0298196 A1 | | 10/2019 | Wong et al. |

FOREIGN PATENT DOCUMENTS

| | | |
|---|---|---|
| JP | 10-85205 A | 4/1998 |
| JP | 2004-505658 A | 2/2004 |
| JP | 2005-95581 A | 4/2005 |

OTHER PUBLICATIONS

Office Action issued Jan. 16, 2024 by the Japanese Patent Office in Japanese Patent Application No. 2020-166154.
Office Action dated Feb. 15, 2024, issued by European Patent Office in European Patent No. 21199428.0.
Communication issued on May 28, 2024 by the Japanese Patent Office in corresponding JP Patent Application No. 2020-166154.

\* cited by examiner

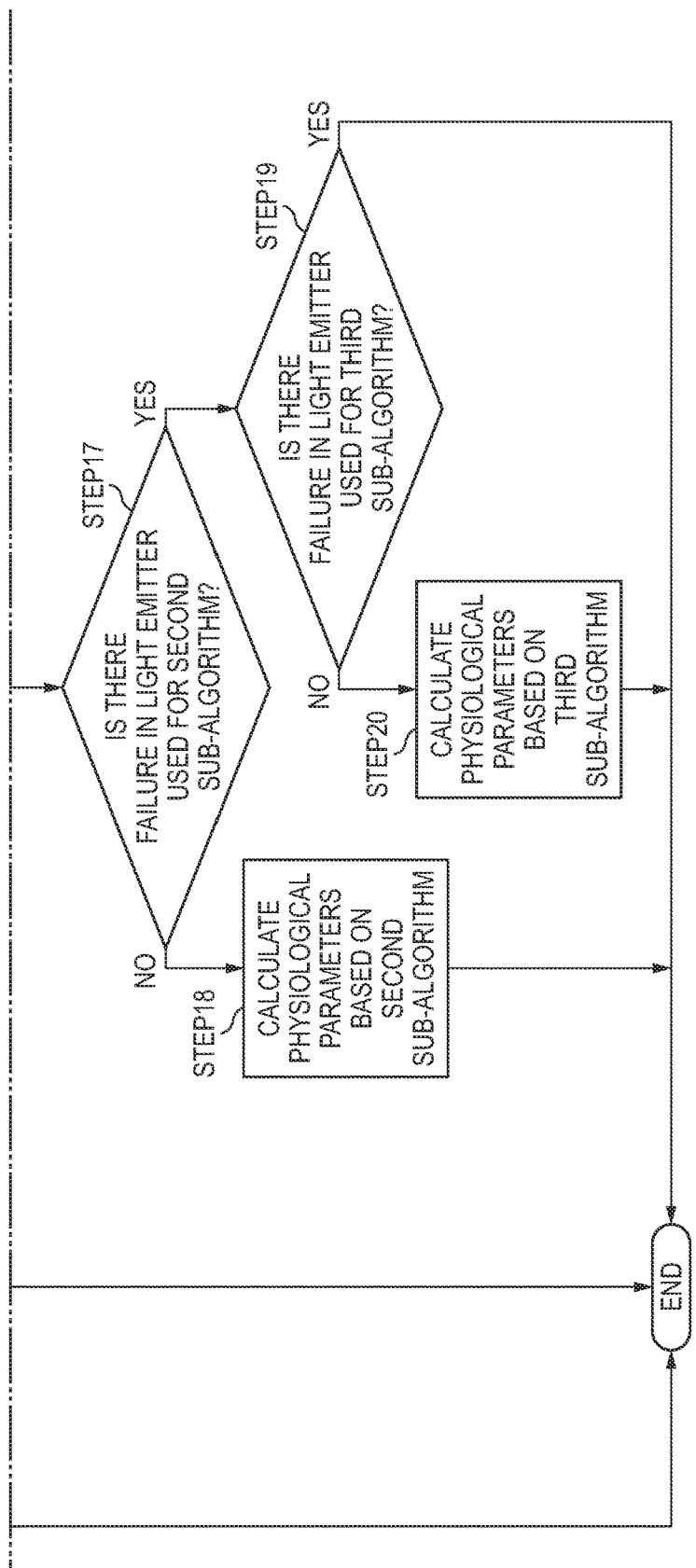

PHYSIOLOGICAL PARAMETER CALCULATION DEVICE AND NON-TRANSITORY COMPUTER-READABLE MEDIUM

CROSS-REFERENCE TO RELATED APPLICATIONS

This application is based on and claims priority under 35 USC 119 from Japanese Patent Application No. 2020-166154 filed on Sep. 30, 2020, the contents of which are incorporated herein by reference.

TECHNICAL FIELD

The presently disclosed subject matter relates to a physiological parameter calculation device and a non-transitory computer-readable medium.

BACKGROUND

A pulse oximeter is known as a device for calculating transcutaneous arterial oxygen saturation ($SpO_2$: hereinafter simply referred to as arterial oxygen saturation) of a subject. A probe electrically connected to the pulse oximeter includes at least one light emitter capable of emitting a red light beam and at least one light emitter capable of emitting an infrared light beam (see Patent Literature 1). An electrocardiogram examination device using a standard 12-lead electrocardiogram is also known. A plurality of electrodes is electrically connected to such an electrocardiogram examination device. When an electrocardiogram examination is performed by the electrocardiogram examination device, four electrodes are attached to the extremities of the subject and six electrodes are attached to the chest of the subject (see Patent Literature 2).

CITATION LIST

Patent Literature

Patent Literature 1: JP2005-095581A
Patent Literature 2: JP2004-505658A

For example, a conventional pulse oximeter (an example of a physiological parameter calculation device) cannot calculate arterial oxygen saturation (an example of a physiological parameter) when a failure occurs in any emitters of a probe. An electrocardiogram examination device (an example of a physiological parameter calculation device) cannot acquire electrocardiogram information (an example of a physiological parameter) when a failure occurs in any electrodes connected to the electrocardiogram examination device. In this respect, there is room for improvement in the conventional physiological parameter calculation device.

SUMMARY

The presently disclosed subject matter is provided with a physiological parameter calculation device that is resistant to a failure of a light emitter or the like of a probe, and a computer program and a non-transitory computer-readable medium used for the physiological parameter calculation device.

A physiological parameter calculation device according to a first aspect for achieving the above object includes:

an acquiring section configured to acquire a plurality of signals corresponding to physiological information of a subject acquired using a plurality of elements of a sensor;

a failure sensing section configured to sense a failure of the plurality of elements; and a calculation section configured to calculate a physiological parameter based on the plurality of signals acquired by the acquiring section, and a first algorithm or a second algorithm, in which the calculation section calculates the physiological parameter based on the first algorithm when the failure sensing section does not sense a failure in an element for acquiring a signal used for the first algorithm among the plurality of elements, and the calculation section calculates the physiological parameter based on the second algorithm when the failure sensing section senses that a failure occurs in an element for acquiring a signal used for the first algorithm among the plurality of elements.

In addition, non-transitory computer-readable medium configured to store a computer program according to a second aspect for achieving the above object causes a computer to implement functions of:

acquiring a plurality of signals corresponding to physiological information of a subject acquired using a plurality of elements of a sensor;

sensing a failure of the plurality of elements; and calculating a physiological parameter based on the plurality of the acquired signals and the first algorithm when a failure of an element for acquiring a signal used for a first algorithm among the plurality of elements is not sensed, or calculating the physiological parameter based on the plurality of the acquired signals and the second algorithm when sensing that a failure occurs in an element for acquiring a signal used for the first algorithm among the plurality of elements.

According to the above configuration, the calculation section calculates the physiological parameter based on the first algorithm when a failure does not occur in the element for acquiring the signal used for the first algorithm among the plurality of elements for acquiring the physiological information of the subject. On the other hand, the calculation section calculates the physiological parameter based on the second algorithm when a failure occurs in the element for acquiring the signal used for the first algorithm among the plurality of elements for acquiring the physiological information of the subject. Therefore, even if a failure occurs in any elements, the calculation section can calculate the physiological parameter.

As described above, according to the above configuration, it is possible to provide a physiological parameter calculation device having failure resistance against a failure of an element of a sensor for acquiring physiological information of a subject.

According to the presently disclosed subject matter, it is possible to provide a physiological parameter calculation device having failure resistance against a failure of a light emitter sensor or the like of a probe, a computer program and a non-transitory computer-readable medium, which are used for the physiological parameter calculation device.

DESCRIPTION OF EMBODIMENTS

Hereinafter, an example of an embodiment of the presently disclosed subject matter will be described with reference to the drawings.

First Embodiment

Figure 1:
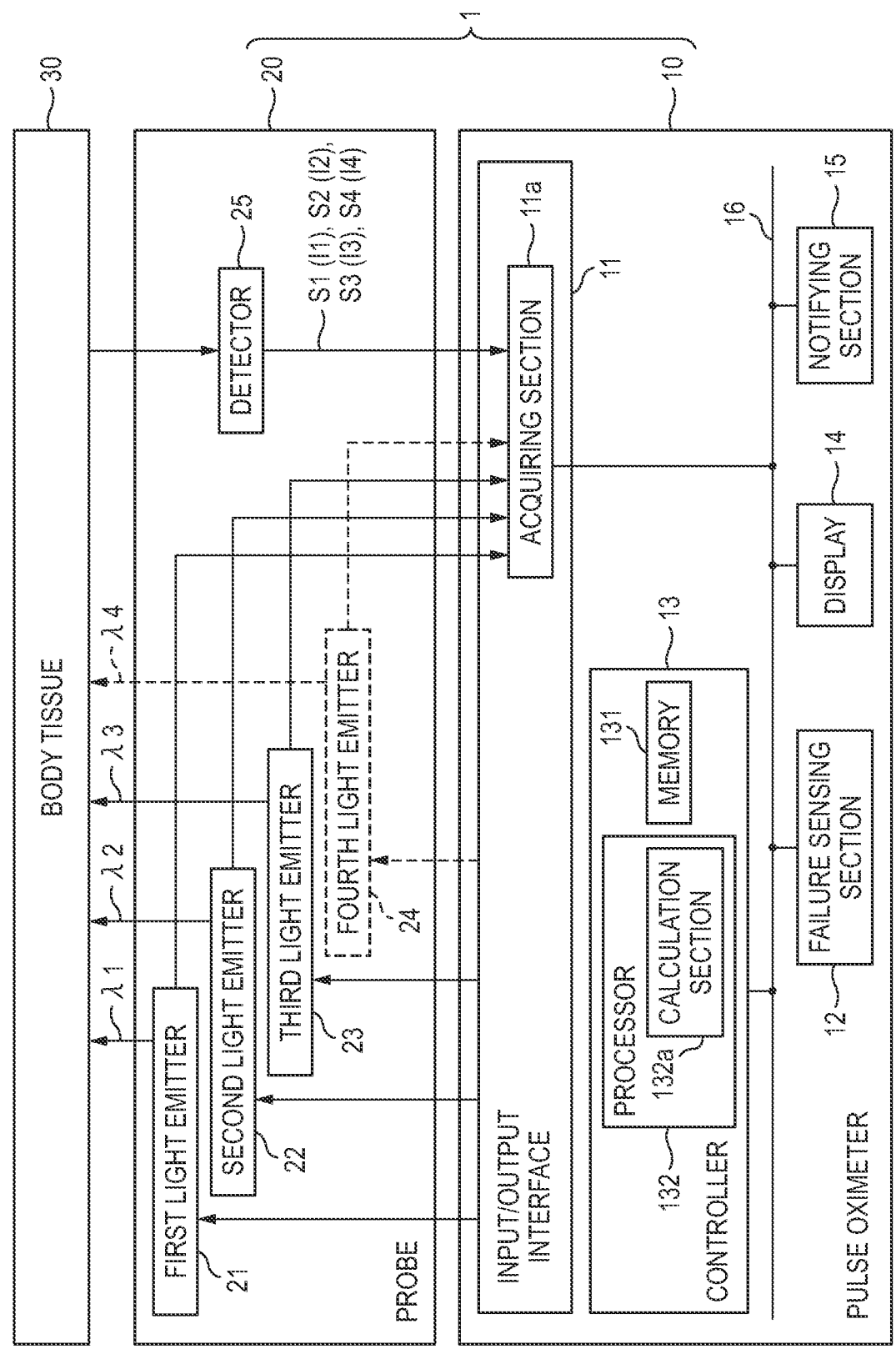
FIG. 1 is a diagram illustrating a functional configuration of a physiological parameter calculation system according to an embodiment of the presently disclosed subject matter.

FIG. 1 is a diagram illustrating a functional configuration of a physiological parameter calculation system 1 according to the present embodiment. As illustrated in FIG. 1, the physiological parameter calculation system 1 includes a pulse oximeter 10 (an example of a physiological parameter calculation device) and a probe 20 (an example of a sensor).

The pulse oximeter 10 is a device for calculating $SpO_2$ (an example of a physiological parameter) of a subject. $SpO_2$ indicates a ratio of oxyhemoglobin to the amount of hemoglobin that can transport oxygen. As illustrated in FIG. 1, the pulse oximeter 10 includes an input/output interface 11, a failure sensing section 12, a controller 13, a display 14, and a notifying section 15. These components are connected to each other via a bus 16 so as to be able to communicate with each other.

The input/output interface 11 includes an acquiring section 11a. The input/output interface 11 is, for example, a connector that allows passage of a signal. The pulse oximeter 10 can be connected to the probe 20 via the input/output interface 11 in a wired or wireless manner.

The probe 20 can be attached to body tissue 30 (a fingertip, an earlobe, or the like) of the subject. As illustrated in FIG. 1, the probe 20 includes a first light emitter 21, a second light emitter 22, a third light emitter 23, and a detector 25. The probe 20 may include a detector other than the detector 25. That is, the probe 20 may include a plurality of detectors.

The first light emitter 21 is a semiconductor light emitter capable of emitting a first light beam having a first wavelength $\lambda 1$. The second light emitter 22 is a semiconductor light emitter capable of emitting a second light beam having a second wavelength $\lambda 2$. The third light emitter 23 is a semiconductor light emitter capable of emitting a third light beam including having a third wavelength $\lambda 3$. The first light beam, the second light beam, and the third light beam can be transmitted through or reflected from the body tissue 30 of the subject. Examples of the semiconductor light emitter include a light emitting diode (LED), a laser diode, and an organic electroluminescence (EL) element. The first wavelength $\lambda 1$ and the second wavelength $\lambda 2$ are, for example, 660 nm or 700 nm. Therefore, the first light beam and the second light beam are a red light beam. On the other hand, the third wavelength $\lambda 3$ is, for example, 880 nm or 940 nm. Therefore, the third light beam is an infrared light beam.

When the probe 20 is connected to the pulse oximeter 10, electricity from the pulse oximeter 10 flows through the first light emitter 21. At this time, the pulse oximeter 10 transmits current information (an electric signal) indicating a current value of the electricity to the first light emitter 21. The first light emitter 21 is configured to generate voltage information (a voltage signal) indicating a voltage value of first light emitter 21 based on the current information. Specifically, the first light emitter 21 generates voltage information of the first light emitter 21 based on a voltage generated when a photoelectric conversion element (not illustrated) of the first light emitter 21 converts electric energy into light energy. The second light emitter 22 and the third light emitter 23 are also configured to respectively generate voltage information indicating voltage values of the second light emitter 22 and the third light emitter 23 based on the current information according to the same principle as that of the first light emitter 21. The generated voltage information of each light emitter is transmitted from each light emitter of the probe 20 to the acquiring section 11a of the pulse oximeter 10.

The detector 25 is an optical sensor having sensitivity to the first wavelength $\lambda 1$, the second wavelength $\lambda 2$, and the third wavelength $\lambda 3$. Examples of the optical sensor include a photodiode, a phototransistor, and a photoresistor.

The detector 25 is configured to detect light transmitted through or reflected from the body tissue 30 of the subject and output a signal corresponding to an intensity of the detected light beam (an example of physiological information). In the present embodiment, the detector 25 detects the first light beam, the second light beam, and the third light beam transmitted through or reflected from the body tissue 30 of the subject. In the present embodiment, a signal corresponding to an intensity I1 of the first light beam is referred to as a first signal S1, a signal corresponding to an intensity I2 of the second light beam is referred to as a second signal S2, and a signal corresponding to an intensity I3 of the third light beam is referred to as a third signal S3.

Next, the acquiring section 11a of the pulse oximeter 10 will be described. The acquiring section 11a corresponds to an input interface in the input/output interface 11. The acquiring section 11a is configured to acquire, from the detector 25, a plurality of signals (the first signal S1, the second signal S2, and the third signal S3) corresponding to the intensities of the light beams (the intensity I1 of the first light beam, the intensity I2 of the second light beam, and the intensity I3 of the third light beam) acquired using the plurality of light emitters (the first light emitter 21, the second light emitter 22, and the third light emitter 23) of the probe 20. The acquired first signal S1, second signal S2, and third signal S3 are transmitted to the controller 13. The acquiring section 11a transmits the voltage information of each light emitter, which is received from each of the first light emitter 21, the second light emitter 22, and the third light emitter 23, to the failure sensing section 12.

The failure sensing section 12 includes at least one processor. The failure sensing section 12 is configured to detect a failure of the plurality of light emitters (the first light emitter 21, the second light emitter 22, and the third light emitter 23). The failure sensing section 12 senses a failure of each light emitter based on the voltage information of each light emitter received from the first light emitter 21, the second light emitter 22, and the third light emitter 23. Specifically, the failure sensing section 12 detects a failure of each light emitter based on information (correlation information) indicating a correspondence relationship between a current signal and a voltage signal, which is determined in advance according to distribution of raw materials of each light emitter, and voltage information of each light emitter received from each light emitter. In the present embodiment, it is assumed that a failure occurs in the light emitter when the function of the light emitter cannot be exerted due to a fault of the photoelectric conversion element, a failure of a wiring board, disconnection of an electric cable connecting the pulse oximeter 10 and each light emitter, or the like. Therefore, the failure sensing section 12 senses a failure of the first light emitter 21 in a case where a voltage value of the first light emitter 21 is lower than an assumed value (assumed range) based on the correlation information, for example, in a case where the first light emitter 21 cannot convert electric energy into light energy. The failure sensing section 12 senses a failure of the first light emitter 21 in a case where a voltage value of the first light emitter 21 exceeds an assumed value (assumed range) based on the correlation information, for example, in a case where the first light emitter 21 cannot receive the current information from the pulse oximeter 10. In the present embodiment, the failure sensing section 12 can detect not only such a failure but also a failure or the like caused by a sensor deviating from a predetermined position. The failure sensing section 12 transmits a failure sensing result indicating a failure occurrence state of each light emitter to the controller 13.

The controller 13 includes a memory 131 and at least one processor 132 as a hardware configuration. The memory 131 includes, for example, a read only memory (ROM) in which various programs and the like are stored, and a random access memory (RAM) having a plurality of work areas in which various programs and the like executed by the processor 132 are stored. The processor 132 is, for example, a central processing unit (CPU), and is configured to expand a program designated from various programs incorporated in the ROM on the RAM and execute various processing in cooperation with the RAM. The processor 132 includes a calculation section 132a. The processor 132 implements the processing of the calculation section 132a by, for example, executing a program in cooperation with the RAM.

Here, the program can be stored using various types of non-transitory computer-readable media and supplied to a computer. The non-transitory computer-readable medium includes various types of tangible storage media. Examples of the non-transitory computer-readable medium include a magnetic recording medium (for example, a flexible disk, a magnetic tape, or a hard disk drive), a photomagnetic recording medium (for example, a magneto-optical disk), a CD-ROM (read only memory), a CD-R, a CD-R/W, and a semiconductor memory (for example, a mask ROM, a programmable ROM (PROM), an erasable PROM (EPROM), or a flash ROM).

The calculation section 132a is configured to calculate $SpO_2$ based on a main algorithm (an example of a first algorithm) or a sub-algorithm (an example of a second algorithm) recorded in the memory 131. The main algorithm is an algorithm used when a failure does not occur in a light emitter for acquiring a signal used for the main algorithm. The sub-algorithm is an algorithm used when a failure occurs in the light emitter for acquiring a signal used for the main algorithm. In order to calculate $SpO_2$, a signal corresponding to at least one red light beam and a signal corresponding to at least one infrared light beam are necessary. Therefore, for example, when a failure occurs in the third light emitter 23, $SpO_2$ is not calculated. That is, in the present embodiment, the sub-algorithm is used when a failure occurs only in the light emitter for acquiring the signal used for the main algorithm among the first light emitter 21 and the second light emitter 22.

When no failure occurs in any of the first light emitter 21, the second light emitter 22, and the third light emitter 23, the calculation section 132a calculates $SpO_2$ based on, for example, the first signal S1, the third signal S3, and the main algorithm. Specifically, first, the calculation section 132a calculates an attenuation variation (hereinafter, referred to as a first variation) $\Delta A_1$ of the first light beam and an attenuation variation (hereinafter, referred to as a third variation) $\Delta A_3$ of the third light beam based on the following expression (1) or (2).

$$\Delta A_1 = \ln[I_1/(I_1 - \Delta I_1)] \approx \Delta I_1/I_1 \qquad (1)$$

$$\Delta A_3 = \ln[I_3/(I_3 - \Delta I_3)] \approx \Delta I_3/I_3 \qquad (2)$$

Note that I1 indicates the intensity of the first light beam, $\Delta I_1$ indicates the variation of the intensity $I_1$ of the first light beam due to the pulsation of the blood of the subject, $I_3$ indicates the intensity of the third light beam, and $\Delta I_3$ indicates the variation of the intensity $I_3$ of the third light beam due to the pulsation of the blood of the subject.

When the first variation $\Delta A_1$ and the third variation $\Delta A_3$ are calculated, the calculation section 132a calculates a value S (decimal notation) of the $SpO_2$ based on the first variation $\Delta A_1$ and the third variation $\Delta A_3$. Specific calculation contents will be described below.

The first variation $\Delta A_1$ and the third variation $\Delta A_3$ can be expressed by the following expression (3) and (4).

$$\Delta A_1 = \Delta A_{b1} + \Delta A_{t1} = E_{b1} Hb \Delta D_b + \Sigma_{t1} \Delta D_t \qquad (3)$$

$$\Delta A_3 = \Delta A_{b3} + \Delta A_{t3} = E_{b3} Hb \Delta D_b + \Sigma_{t3} \Delta D_t \qquad (4)$$

Here, E indicates an extinction coefficient (dl g$^{-1}$cm$^{-1}$). Hb indicates the hemoglobin concentration in blood (g dl$^{-1}$). $\Sigma$ indicates the light attenuation rate (cm$^{-1}$). $\Delta D$ indicates a change in thickness (cm) due to pulsation of blood. The subscript b indicates blood. The subscript t indicates tissue other than blood. The subscript 1 indicates the first light beam. The subscript 3 indicates the third light beam.

Expressions (3) and (4) can be modified as follows.

$$\begin{aligned}\Delta A_1 &= E_{b1} H_b \Delta D_b + \sum\nolimits_{t1} \Delta D_t \\ &= \left[E_{b1} + \left(\sum\nolimits_{t1} \Delta D_t\right)/(Hb\Delta D_b)\right](Hb\Delta D_b) \\ &= (E_{b1} + E_{x1})(Hb D_b)\end{aligned} \qquad (5)$$

$$\begin{aligned}\Delta A_3 &= E_{b3} Hb \Delta D_b + \sum\nolimits_{t3} \Delta Dt \\ &= \left[E_{b3} + \left(\sum\nolimits_{t3} \Delta D_t\right)/(Hb\Delta D_b)\right](Hb\Delta D_b) \\ &= (E_{b3} + E_{x3})(Hb D_b)\end{aligned} \qquad (6)$$

Here, $E_x$ is a variable obtained by replacing $(\Sigma_t \Delta D_t)/(Hb \Delta D_b)$. The subscript 1 indicates the first light beam. The subscript 3 indicates the third light beam.

Expressions (5) and (6) can be modified as follows.

$$E_{b1} + E_{x1} - \Delta A_1/(Hb\Delta D_b) = 0 \qquad (7)$$

$$E_{b3} + E_{x3} - \Delta A_3/(Hb\Delta D_b) = 0 \qquad (8)$$

With respect to Expression (7), the extinction coefficient $E_{b1}$ of the blood of the first light beam can be approximated by the extinction coefficient $E_{b3}$ of the blood of the third light beam as follows.

$$E_{b1} = a_1 E_{b3} + b_1 \qquad (9)$$

Here, a and b are constants. The subscript 1 indicates the first light beam. The subscript 3 indicates the third light beam.

$E_{x1}$ of the first light beam can be approximated by $E_{x3}$ of the third light beam as follows.

$$E_{x1} = \alpha_1 E_{x3} + \beta_1 \qquad (10)$$

Here, $\alpha$ and $\beta$ are constants. The subscript 1 indicates the first light beam. The subscript 3 indicates the third light beam.

When Expression (7) and Expression (8) are rewritten using Expression (9) and Expression (10), the following Expression (11) and Expression (12) are obtained.

$$E_{b3}+E_{x3}-\Delta A_3/(Hb\Delta D_b)=0$$

$$E_{b3}-\Delta A_3/(Hb\Delta D_b)=-E_{x3} \quad (11)$$

$$(a_1E_{b3}+b_1)+(\alpha_1E_{x3}+\beta_1)-\Delta A_1/(Hb\Delta D_b)=0$$

$$a_1E_{b3}-\Delta A_1/(Hb\Delta D_b)=-\alpha_1E_{x3}-\beta_1-b_1 \quad (12)$$

When a statistically obtained constant value is used as $E_{x3}$, the values of $E_{b3}$ and Hb $\Delta D_b$, which are variables, are obtained by calculating the following determinant (13).

$$\begin{pmatrix} 1 & -\Delta A3 \\ a1 & -\Delta A1 \end{pmatrix} \begin{pmatrix} Eb3 \\ \dfrac{1}{Hb\Delta Db} \end{pmatrix} = \begin{pmatrix} -Ex3 \\ -\alpha1Ex3 - \beta1 - b1 \end{pmatrix} \quad (13)$$

When SpO$_2$, which is expressed in percentage, is converted into S, which is expressed in decimal, the extinction coefficient $E_{b3}$ of the third light beam is expressed by the following expression (14).

$$E_{b3}=E_{o3}S+E_{r3}(1-S) \quad (14)$$

Here, $E_o$ indicates an extinction coefficient of oxyhemoglobin. Er indicates an extinction coefficient of deoxyhemoglobin. The subscript 3 indicates the third light beam. Therefore, the calculation section 132a calculates a value S of the SpO$_2$ by the following expression (15).

$$S=(E_{b3}-E_{r3})/(E_{o3}-E_{r3}) \quad (15)$$

On the other hand, for example, when the failure sensing section 12 detects a failure in the first light emitter 21, the calculation section 132a calculates a value S of SpO$_2$, which is expressed in decimal, based on the second signal S2, the third signal S3, and the sub-algorithm. Specifically, first, the calculation section 132a calculates a variation in light attenuation of the second light beam (hereinafter, referred to as a second variation) $\Delta A_1$ and the third variation $\Delta A_3$ based on the following expression (16) or the above expression (2).

$$\Delta A2=\ln[I_2/(I_2-\Delta I_2)] \approx \Delta I_2/I_2 \quad (16)$$

Note that $I_2$ indicates the intensity of the second light beam, and $\Delta I_2$ indicates the variation of the intensity $I_2$ of the second light beam due to the pulsation of the blood of the subject.

When the second variation $\Delta A_2$ and the third variation $\Delta A_3$ are calculated, the calculation section 132a calculates the value S (decimal notation) of the SpO$_2$ based on the second variation $\Delta A_2$ and the third variation $\Delta A_3$. Specific calculation contents will be described below. In the description of the contents of the calculation, the description of parts overlapping with the example in which the SpO$_2$ is calculated based on the first signal S1, the third signal S3, and the main algorithm will be appropriately omitted.

The second variation $\Delta A_2$ can be expressed by the following expression (17).

$$\Delta A_2=\Delta A_{b2}+\Delta A_{t2}=E_{b2}Hb\Delta D_b+\Sigma_{t2}\Delta D_t \quad (17)$$

Here, the subscript 2 indicates the second light beam.
Expression (17) can be modified as follows.

$$\Delta A_2 = E_{b2}Hb\Delta D_b + \sum_{t2} \Delta D_t \quad (18)$$
$$= \left[E_{b2} + \left(\sum_{t2} \Delta D_t\right)/(Hb\Delta D_b)\right](Hb\Delta D_b)$$
$$= (E_{b2} + E_{x2})(HbD_b)$$

Here, $E_x$ is a variable obtained by replacing $(\Sigma_t \Delta D_t)/(Hb \Delta D_b)$. The subscript 2 indicates the second light beam.
Expression (18) can be modified as follows.

$$E_{b2}+E_{x2}-\Delta A_2/(Hb\Delta D_b)=0 \quad (19)$$

With respect to Expression (19), the extinction coefficient $E_{b2}$ of the blood of the second light beam can be approximated by the extinction coefficient $E_{b3}$ of the blood of the third light beam as follows.

$$E_{b2}=a_2E_{b3}+b_2 \quad (20)$$

Here, a and b are constants. The subscript 2 indicates the second light beam. The subscript 3 indicates the third light beam.

$E_{x2}$ of the second light beam can be approximated by $E_{x3}$ of the third light beam as follows.

$$E_{x2}=\alpha_2E_{x3}+\beta_2 \quad (21)$$

Here, $\alpha$ and $\beta$ are constants. The subscript 2 indicates the second light beam. The subscript 3 indicates the third light beam.

When Expression (19) is rewritten using Expression (20) and Expression (21), the following Expression (22) is obtained.

$$(\alpha_2E_{b3}+b_2)+(\alpha_2E_{x3}+\beta_2)-\Delta A_2/(Hb\Delta D_b)=0$$

$$\alpha_2E_{b3}-\Delta A_2/(Hb\Delta D_b)=-\alpha_2E_{x3}-\beta_2-b_2 \quad (22)$$

When a statistically obtained constant value is used as $E_{x3}$, the values of $E_{b3}$ and Hb $\Delta D_b$, which are variables, are obtained by calculating the following determinant (23).

$$\begin{pmatrix} 1 & -\Delta A3 \\ a2 & -\Delta A2 \end{pmatrix} \begin{pmatrix} Eb3 \\ \dfrac{1}{Hb\Delta Db} \end{pmatrix} = \begin{pmatrix} -Ex3 \\ -\alpha2Ex3 - \beta2 - b2 \end{pmatrix} \quad (23)$$

When SpO$_2$, which is expressed in percentage, is converted into S, which is expressed in decimal, the extinction coefficient $E_{b3}$ of the third light beam is expressed by the above expression (14). Therefore, the calculation section 132a calculates the value S of the SpO$_2$ by the above expression (15).

The controller 13 is configured to determine the presence or absence of a failure in each light emitter based on the failure sensing result received from the failure sensing section 12. Based on the determination, the controller 13 determines an algorithm used by the calculation section 132a to calculate SpO$_2$. The controller 13 causes the calculation section 132a to calculate SpO$_2$ based on the determination. Therefore, the algorithm used for the calculation of SpO$_2$ is appropriately selected according to the state of each light emitter. For example, in a case where the signals used for the main algorithm are the first signal S1 and the third signal S3, the controller 13 controls the calculation section 132a to calculate SpO$_2$ based on the main algorithm when the failure sensing section 12 senses no failure in any of the light emitters or senses a failure only in the second light emitter 22. On the other hand, when the failure sensing section 12 has sensed a failure in the first light emitter 21, the controller 13 controls the calculation section 132a to calculate $SpO_2$ based on the sub-algorithm. In other cases, the controller 13 does not cause the calculation section 132a to calculate $SpO_2$.

When the calculation section 132a calculates the $SpO_2$, the controller 13 generates a display signal for displaying the $SpO_2$ on the display 14, and transmits the display signal to the display 14.

The controller 13 generates a failure signal when the failure sensing section 12 detects that a failure has occurred in at least one of the first light emitter 21, the second light emitter 22, and the third light emitter 23. The generated failure signal is transmitted to the notifying section 15.

The display 14 includes, for example, a liquid crystal display (LCD). The display 14 displays predetermined information based on a display signal received from the controller 13. Examples of the predetermined information include $SpO_2$, pulse rate, remaining battery level, and date and time.

The notifying section 15 is configured to notify that a failure has occurred in at least one of the first light emitter 21, the second light emitter 22, and the third light emitter 23 based on the failure signal received from the controller 13. The notification of the notifying section 15 may be performed by at least one of visual notification, auditory notification, and tactile notification. Through the notification of the notifying section 15, a medical worker can recognize that a failure has occurred in at least one light emitter, and the calculation of $SpO_2$ has been performed based on the sub-algorithm. The mode of notification that a failure has occurred in the first light emitter 21 or the second light emitter 22 may be different from the mode of notification that a failure has occurred in the first light emitter 21 and the second light emitter 22, or the third light emitter 23. In this case, the medical worker can easily determine whether the calculation of $SpO_2$ is executed.

Figure 2:
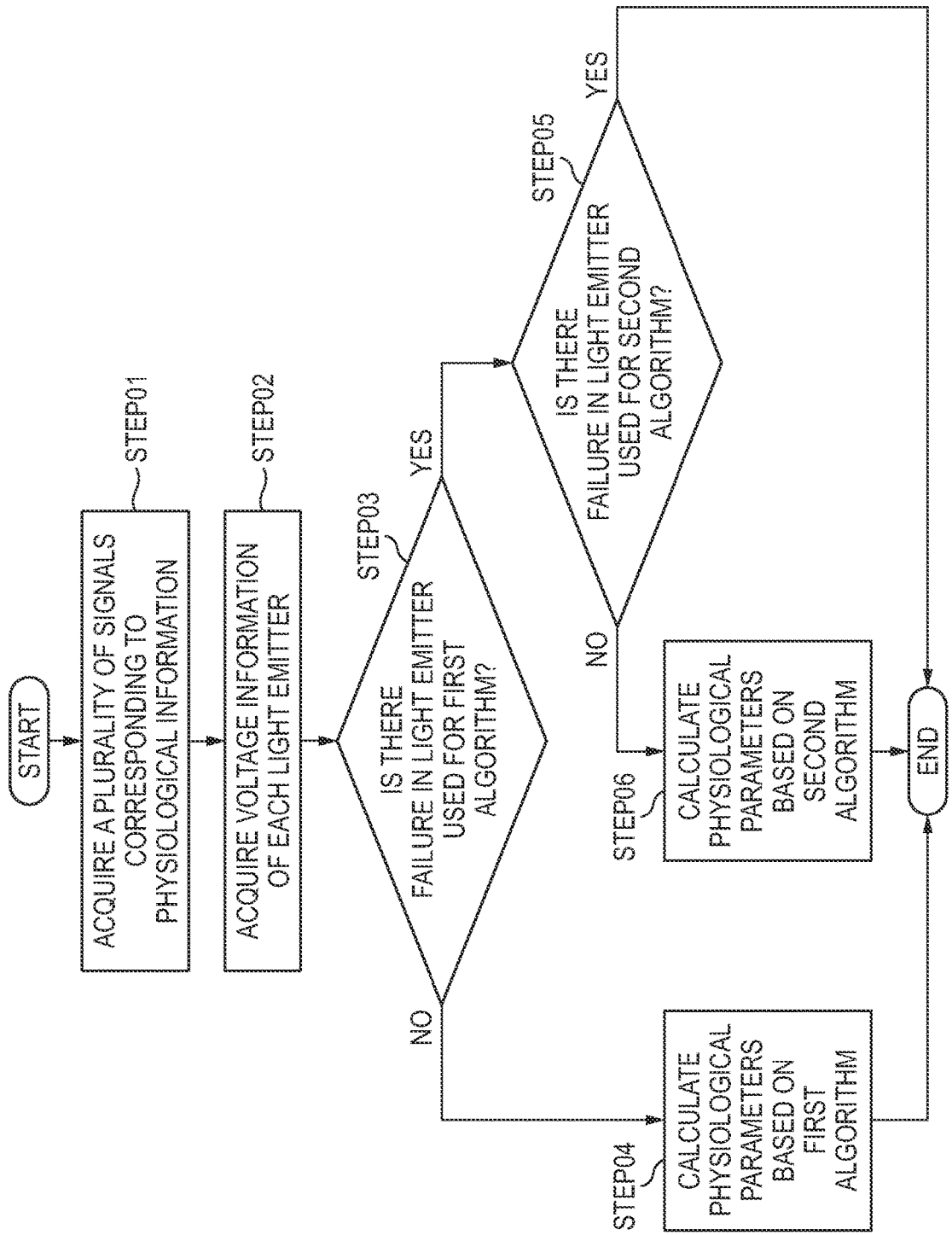
FIG. 2 is a flowchart of a processing content executed by a controller in the first embodiment.

Next, the processing contents executed by the controller 13 in the first embodiment will be described in detail with reference to FIG. 2. FIG. 2 is a flowchart of a processing content executed by the controller 13 in the first embodiment. In the present embodiment, it is assumed that the first wavelength $\lambda 1$ is 660 nm and the second wavelength $\lambda 2$ is 700 nm.

A red light beam having a wavelength of 660 nm is generally used mainly for the measurement of $SpO_2$, whereas a red light beam having a wavelength of 700 nm is used mainly for the measurement of the carbon monoxide concentration. This is because $SpO_2$ can be measured more accurately when $SpO_2$ is measured using the red light beam having a wavelength of 660 nm than the case of measuring $SpO_2$ using the red light beam having a wavelength of 700 nm. Therefore, in the present embodiment, the signals used for the main algorithm are the first signal S1 and the third signal S3. That is, in the present embodiment, the light emitters used for the main algorithm are the first light emitter 21 and the third light emitter 23, and the light emitters used for the sub-algorithm are the second light emitter 22 and the third light emitter 23.

As illustrated in FIG. 2, in STEP 01, the acquiring section 11a acquires a plurality of signals (a first signal S1, a second signal S2, and a third signal S3) from the detector 25. The acquired first signal S1, second signal S2, and third signal S3 are transmitted to the controller 13.

In STEP 02, the acquiring section 11a acquires, from each of the light emitters, voltage information generated based on the current information transmitted from the pulse oximeter 10 to the plurality of light emitters (the first light emitter 21, second light emitter 22, and third light emitter 23). The acquired voltage information is transmitted to the failure sensing section 12. The failure sensing section 12 senses a failure of the plurality of light emitters based on the acquired voltage information, and transmits a failure sensing result to the controller 13.

In STEP 03, the controller 13 determines whether there is a failure in the light emitters used for the main algorithm, that is, the first light emitter 21 and the third light emitter 23, based on the failure sensing result received from the failure sensing section 12. In a case where the controller 13 determines that no failure has occurred in the first light emitter 21 and the third light emitter 23 (NO in STEP 03), the calculation section 132a calculates the $SpO_2$ based on the first signal S1, the third signal S3, and the main algorithm (STEP 04). On the other hand, in a case where the controller 13 determines that a failure has occurred in at least one of the first light emitter 21 and the third light emitter 23 (YES in STEP 03), the processing proceeds to STEP 05.

In STEP 05, the controller 13 determines whether there is a failure in the light emitters used for the sub-algorithm, that is, the second light emitter 22 and the third light emitter 23, based on the failure sensing result received from the failure sensing section 12. In a case where the controller 13 determines that no failure has occurred in the second light emitter 22 and the third light emitter 23 (NO in STEP 05), the calculation section 132a calculates $SpO_2$ based on the second signal S2, the third signal S3, and the sub-algorithm (STEP 06). On the other hand, in a case where the controller 13 determines that a failure has occurred in at least one of the second light emitter 22 and the third light emitter 23 (YES in STEP 05), the controller 13 ends the present processing without causing the calculation section 132a to perform the calculation of $SpO_2$.

In the pulse oximeter according to the related art, when a failure occurs in any emitters of the probe, the arterial oxygen saturation may not be calculated. Therefore, when a failure occurs in any emitters, there is a possibility that the medical worker cannot measure the arterial oxygen saturation using the pulse oximeter until the failure is resolved. For example, in a case where the arterial oxygen saturation of a subject is 90% or less, the subject may be in a respiratory failure state, so that immediate action is required. Therefore, it is desirable that a state in which the pulse oximeter cannot calculate the arterial oxygen saturation is not generated so that the medical worker can immediately notice the change in the condition of the subject. In view of such circumstances, there is a demand for a pulse oximeter capable of continuously calculating the arterial oxygen saturation even when a failure occurs in any emitters of a probe, that is, having failure resistance against the failure of the light emitter of the probe.

According to the pulse oximeter 10 of the present embodiment, when no failure occurs in the first light emitter 21 and the third light emitter 23, the calculation section 132a calculates $SpO_2$ based on the main algorithm. On the other hand, for example, in a case where a failure has occurred in the first light emitter 21, the calculation section 132a calculates $SpO_2$ based on the sub-algorithm. Specifically, in a case where a failure has occurred in the first light emitter 21, the calculation section 132a calculates $SpO_2$ based on the second signal S2, the third signal S3, and the sub-algorithm. As described above, even if a failure has occurred in any emitters of the probe 20, the calculation section 132a can calculate the $SpO_2$. Therefore, the pulse oximeter 10 has a failure resistance against a failure of the light emitter of the probe 20.

In the pulse oximeter 10 according to the present embodiment, the failure sensing section 12 can sense a failure of a plurality of light emitters (the first light emitter 21, the second light emitter 22, and the third light emitter 23) based on voltage information indicating voltage values of the plurality of light emitters. Specifically, the failure sensing section 12 can sense the failure of the plurality of light emitters by comparing an assumed value based on the current information and the correlation information transmitted from the pulse oximeter 10 to the plurality of light emitters with the voltage information received from the plurality of light emitters. As described above, the pulse oximeter 10 can sense a failure of each light emitter with a relatively simple configuration.

Second Embodiment

Figure 3:
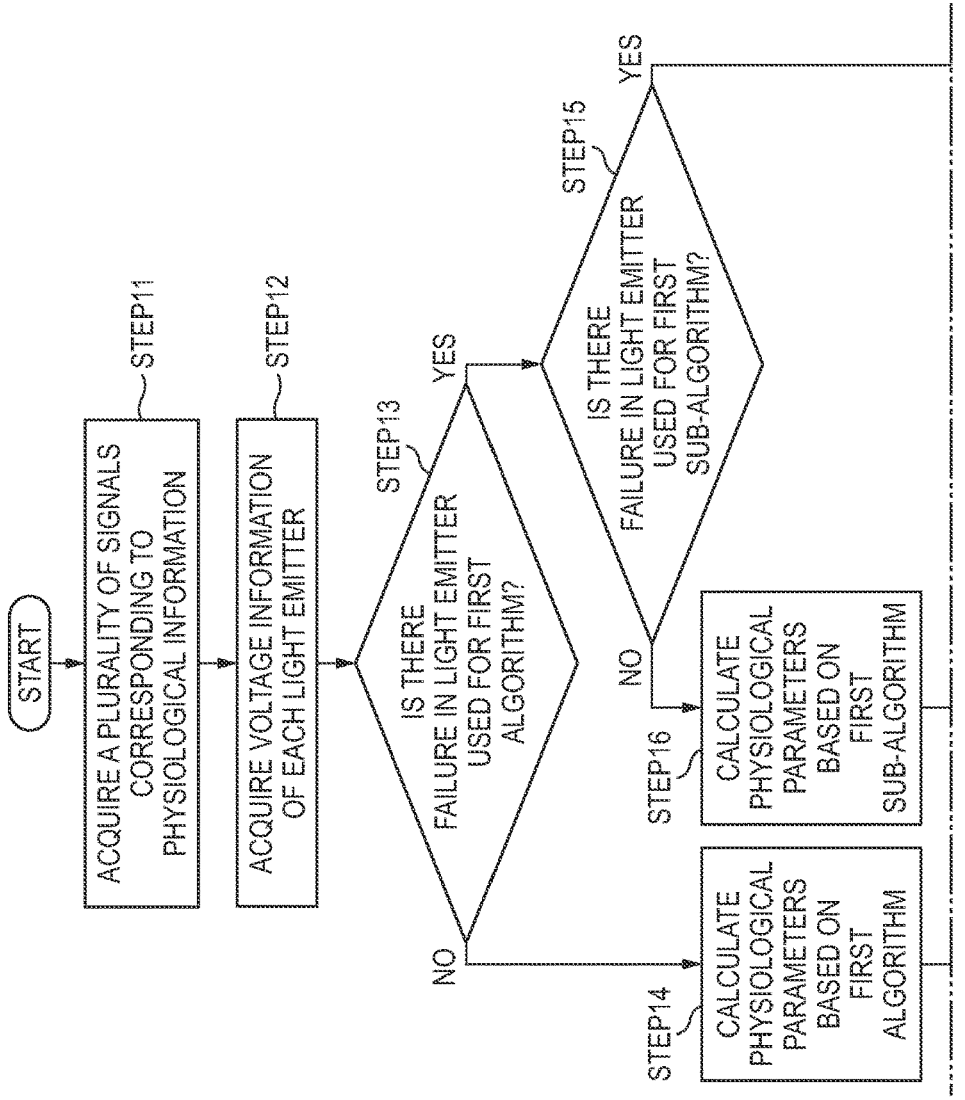
FIG. 3 is a flowchart of a processing content executed by a controller according to a second embodiment.

Next, the processing content executed by the controller 13 in the second embodiment will be described in detail with reference to FIGS. 1 and 3. In the description of the second embodiment, the description of the same parts as those of the first embodiment will be omitted. The second embodiment is different from the first embodiment in that the probe 20 further includes a fourth light emitter 24 as indicated by a broken line in FIG. 1. In the present embodiment, it is assumed that the third wavelength λ3 is 940 nm. Further, also in the present embodiment, it is assumed that the light emitters used for the main algorithm are the first light emitter 21 and the third light emitter 23.

In the present embodiment, the sub-algorithm includes a first sub-algorithm, a second sub-algorithm, and a third sub-algorithm. The light emitters used for the first sub-algorithm are the first light emitter 21 and the fourth light emitter 24. The light emitters used for the second sub-algorithm are the second light emitter 22 and the third light emitter 23. The light emitters used for the third sub-algorithm are the second light emitter 22 and the fourth light emitter 24.

The fourth light emitter 24 is, for example, a semiconductor light emitter capable of emitting a fourth light beam having a fourth wavelength λ4. Examples of the semiconductor light emitter include a light emitting diode (LED), a laser diode, and an organic electroluminescence (EL) element. The fourth wavelength λ4 is, for example, 880 nm. Therefore, the fourth light beam is an infrared light beam.

The fourth light emitter 24 is configured to generate voltage information based on the current information transmitted from the pulse oximeter 10, which is the same as the other light emitters (the first light emitter 21, the second light emitter 22, and the third light emitter 23). The generated voltage information is transmitted to the acquiring section 11a of the pulse oximeter 10.

In the present embodiment, the detector 25 also has sensitivity to the fourth wavelength λ4. The detector 25 is also configured to receive the fourth light beam transmitted through or reflected from the body tissue 30 of the subject and output a signal (fourth signal S4) corresponding to an intensity I4 (an example of physiological information) of the received fourth light beam.

Next, the processing contents executed by the controller 13 in the second embodiment will be described in detail with reference to FIG. 3. FIG. 3 is a flowchart of a processing content executed by the controller 13 in the second embodiment.

STEPs 11 to 14 are the same as STEPs 01 to 04 in FIG. 2. In this case, the acquiring section 11a also acquires the fourth signal S4 from the detector 25 (STEP 11). In addition, the acquiring section 11a acquires, from the fourth light emitter 24, voltage information of the fourth light emitter 24 generated based on the current information transmitted from the pulse oximeter 10 to the fourth light emitter 24 (STEP 12). At this time, the failure sensing section 12 also detects a failure of the fourth light emitter 24 based on the voltage information of the fourth light emitter 24 acquired by the acquiring section 11a, and transmits a failure sensing result to controller 13.

In a case where the controller 13 determines that a failure has occurred in at least one of the first light emitter 21 and the third light emitter 23 in STEP 13 (YES in STEP 13), the processing proceeds to STEP 15. In STEP 15, the controller 13 determines whether there is a failure in the light emitters used for the first sub-algorithm, that is, the first light emitter 21 and the fourth light emitter 24, based on the failure sensing result received from the failure sensing section 12. In a case where the controller 13 determines that no failure has occurred in the first light emitter 21 and the fourth light emitter 24 (NO in STEP 15), the calculation section 132a calculates $SpO_2$ based on the first signal S1, the fourth signal S4, and the first sub-algorithm (STEP 16). On the other hand, in a case where the controller 13 determines that there is a failure in at least one of the first light emitter 21 and the fourth light emitter 24 (YES in STEP 15), the processing proceeds to STEP 17.

In STEP 17, the controller 13 determines whether there is a failure in the light emitters used for the second sub-algorithm, that is, the second light emitter 22 and the third light emitter 23, based on the failure sensing result received from the failure sensing section 12. In a case where the controller 13 determines that no failure has occurred in the second light emitter 22 and the third light emitter 23 (NO in STEP 17), the calculation section 132a calculates $SpO_2$ based on the second signal S2, the third signal S3, and the second sub-algorithm (STEP 18). On the other hand, in a case where the controller 13 determines that there is a failure in at least one of the second light emitter 22 and the third light emitter 23 (YES in STEP 17), the processing proceeds to STEP 19.

In STEP 19, the controller 13 determines whether there is a failure in the light emitters used for the third sub-algorithm, that is, the second light emitter 22 and the fourth light emitter 24, based on the failure sensing result received from the failure sensing section 12. In a case where the controller 13 determines that no failure has occurred in the second light emitter 22 and the fourth light emitter 24 (NO in STEP 19), the calculation section 132a calculates $SpO_2$ based on the second signal S2, the fourth signal S4, and the third sub-algorithm (STEP 20). On the other hand, in a case where the controller 13 determines that there is a failure in at least one of the second light emitter 22 and the fourth light emitter 24 (YES in STEP 19), the controller 13 ends the present processing without causing the calculation section 132a to perform the calculation of $SpO_2$.

According to the pulse oximeter 10 of the present embodiment, for example, in a case where a failure occurs only in the third light emitter 23, the controller 13 determines to use the first sub-algorithm, and controls the calculation section 132a to calculate $SpO_2$ using the first sub-algorithm. Therefore, in the present embodiment, even if a failure occurs in the third light emitter 23, the calculation section 132a of the pulse oximeter 10 can calculate $SpO_2$, so that the failure resistance against the failure of the plurality of light emitters of the probe 20 is further improved.

Third Embodiment

Figure 4:
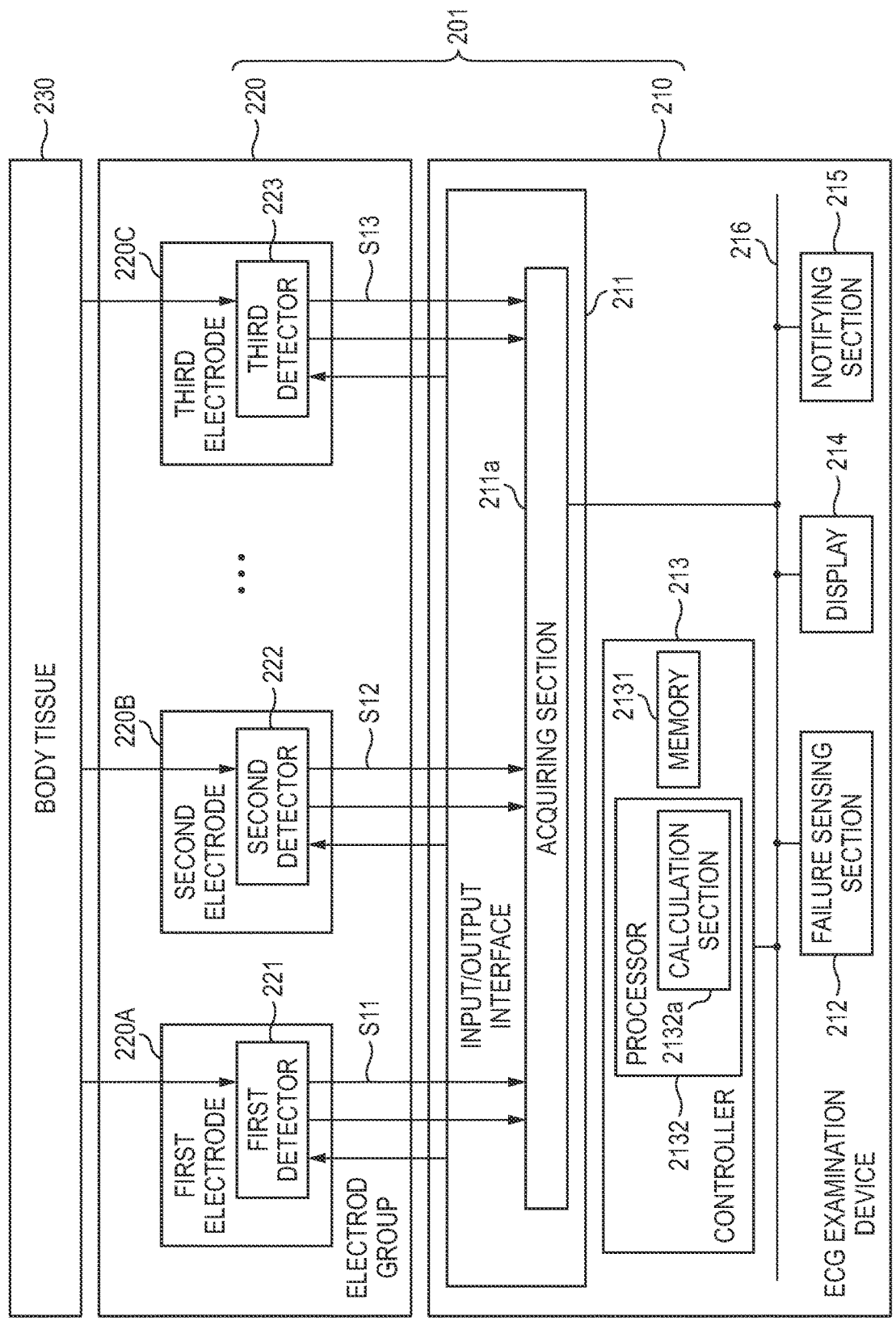
FIG. 4 is a diagram illustrating a functional configuration of a physiological parameter calculation system according to an embodiment of the presently disclosed subject matter.

Next, a physiological parameter calculation system 201 according to a third embodiment will be described with reference to FIG. 4. In the description of the third embodiment, the description of the same parts as those of the first embodiment will be omitted. FIG. 4 is a diagram illustrating a functional configuration of the physiological parameter calculation system 201 according to the present embodiment.

As illustrated in FIG. 4, the physiological parameter calculation system 201 includes an electrocardiogram examination device 210 (an example of a physiological parameter calculation device) and an electrode group 220 (an example of a sensor).

The electrocardiogram examination device 210 is a device for calculating electrocardiogram data (an example of a physiological parameter) of a subject using a standard 12-lead electrocardiogram. As illustrated in FIG. 4, the electrocardiogram examination device 210 includes an input/output interface 211, a failure sensing section 212, a controller 213, a display 214, and a notifying section 215. These components are connected to each other via a bus 216 so as to be able to communicate with each other. The electrocardiogram examination device 210 also includes a power supply, a digital/analog circuit, and the like (not illustrated).

The input/output interface 211 may have the same configuration as the input/output interface 11, and includes an acquiring section 211a. The electrocardiogram examination device 210 can be connected to the electrode group 220 via the input/output interface 211 in a wired or wireless manner.

Here, the electrode group 220 will be described. The electrode group 220 includes a plurality of electrodes (for example, 10 electrodes) including a first electrode 220A, a second electrode 220B, and a third electrode 220C. Each electrode is attached to body tissue 230 (such as extremities or chest) of a subject. Each electrode comes into contact with a measurement part of the subject and functions as a sensor for deriving a potential change of the measurement part. Each electrode is configured to derive a potential difference of a measurement part. In addition, the electrocardiogram examination device 210 also includes an indifferent electrode (not illustrated), and the indifferent electrode is configured to remove external noise induced in the same phase in the electrode group 220. Further, each electrode includes a detector. For example, the first electrode 220A includes a first detector 221, the second electrode 220B includes a second detector 222, and the third electrode 220C includes a third detector 223.

The first detector 221 is configured to detect an electrocardiogram signal (a first signal S11) corresponding to an electromotive force (an example of physiological information) transmitted from an attachment gel included in the first electrode 220A, and to transmit the first signal S11 to the acquiring section 211a via a lead wire.

Since the detectors other than the first detector 221 (for example, the second detector 222 and the third detector 223) have the same configuration as the first detector 221, the description thereof will be omitted. Each of the electrodes including the other detectors is attached to a part of the body tissue 230 that is different from a part to which the first electrode 220A including the first detector 221 is attached. In the present embodiment, an electrocardiogram signal corresponding to an electromotive force acquired by using the second detector 222 is referred to as a second signal S12, and an electrocardiogram signal corresponding to an electromotive force acquired by using the third detector 223 is referred to as a third signal S13.

Each detector is configured to generate voltage information indicating a voltage value of each detector by the same principle as in the first embodiment. The generated voltage information related to each detector is transmitted from each detector to the acquiring section 211a of the electrocardiogram examination device 210.

Next, the acquiring section 211a of the electrocardiogram examination device 210 will be described. The acquiring section 211a is configured to acquire, from the electrode group 220, a plurality of electrocardiogram signals corresponding to electromotive forces acquired using a plurality of detectors of the electrode group 220. The plurality of acquired electrocardiogram signals (the first signal S11, the second signal S12, and the third signal S13) are transmitted to the controller 213. In addition, the acquiring section 211a transmits the voltage information received from each detector to the failure sensing section 212.

The failure sensing section 212 has the same configuration as that of the failure sensing section 12 in the first embodiment, and thus the description thereof will be omitted. In the present embodiment, it is assumed that a failure occurs in the detector when the function of the detector cannot be exerted due to a fault of a photoelectric conversion element, disconnection of an electric cable connecting the electrocardiogram examination device 210 and each detector, electrode detachment, or the like.

The controller 213 includes one or more memory 2131 and one or more processor 2132 as a hardware configuration. Since the memory 2131 and the processor 2132 have the same configurations as those of the memory 131 and the processor 132 in the first embodiment, the description thereof will be omitted. The processor 2132 includes a calculation section 2132a.

The calculation section 2132a is configured to calculate electrocardiogram data based on a main algorithm (an example of a first algorithm) or a sub-algorithm (an example of a second algorithm) recorded in the memory 2131. The main algorithm is an algorithm used when a failure does not occur in a detector for acquiring a signal used for the main algorithm. The sub-algorithm is an algorithm used when a failure has occurred in a detector for acquiring a signal used for the main algorithm. When electrocardiogram data is calculated using the standard 12-lead method, ten electrodes are used, four of which are attached to the extremities, and the remaining six electrodes are attached to the chest. In the present embodiment, it is assumed that the first electrode 220A and the second electrode 220B are attached adjacent to each other on the chest of the subject, and the third electrode 220C is attached to the left leg of the subject. Therefore, in the present embodiment, the electrocardiogram data can be calculated even when a failure occurs in the first electrode 220A or the second electrode 220B, but the electrocardiogram data is not calculated when a failure occurs in the third detector 223.

When no failure occurs in any of the first detector 221, the second detector 222, and the third detector 223, the calculation section 2132a calculates electrocardiogram data based on, for example, the first signal S11, the second signal S12, the third signal S13, and the main algorithm. Specifically, when a potential difference between predetermined two electrodes is induced, the calculation section 2132a integrates potential changes of the respective inductions and calculates electrocardiogram data.

On the other hand, for example, when a failure occurs in the first detector 221, and the electrocardiogram data can be calculated by using the second detector 222 instead of the first detector 221, the calculation section 2132a calculates the electrocardiogram data based on the second signal S22, the third signal S23, and the sub-algorithm.

Based on the same principle as in the first embodiment, the controller 213 determines the presence or absence of a failure in each detector, and determines an algorithm used by the calculation section 2132a to calculate electrocardiogram data. The controller 213 causes the calculation section 2132a to calculate the electrocardiogram data based on the determination.

The controller 213 generates a display signal for displaying the electrocardiogram data on the display 214 and transmits the display signal to the display 214 according to the same principle as in the first embodiment.

The controller 213 generates a failure signal when the failure sensing section 212 senses that a failure has occurred in at least one of the first detector 221, the second detector 222, and the third detector 223. The generated failure signal is transmitted to the notifying section 215.

The display 214 may have the same configuration as the display 14 in the first embodiment.

The notifying section 215 is configured to notify that a failure has occurred in at least one of the first detector 221, the second detector 222, and the third detector 223 based on the failure signal received from the controller 213. The notification of the notifying section 215 is the same as the notification of the notifying section 15 according to the first embodiment, and thus the description thereof will be omitted.

Next, the processing contents executed by the controller 213 in the third embodiment will be described in detail with reference to FIG. 2. In the present embodiment, it is assumed that the main algorithm is used when a failure has not occurred in any of the detectors, and the sub-algorithm is used when a failure has occurred in only one of the first detector 221 and the second detector 222. In the present embodiment, it is assumed that no failure occurs in the detectors of the electrodes other than the first electrode 220A, the second electrode 220B, and the third electrode 220C.

The controller 213 executes STEP 01 to STEP 03 in FIG. 2. When no failure occurs in any of the detectors (NO in STEP 03), the calculation section 2132a calculates electrocardiogram data based on the first signal S11, the second signal S12, the third signal S13, and the main algorithm (STEP 04). On the other hand, in a case where the controller 213 determines that a failure has occurred in any of the detectors (YES in STEP 03), the processing proceeds to STEP 05.

In STEP 05, the controller 213 determines whether there is a failure in the first detector 221 and the second detector 222, or the third detector 223. In a case where the controller 13 determines that no failure has occurred in the first detector 221 and the second detector 222, or the third detector 223 (NO in STEP 05), the calculation section 2132a calculates electrocardiogram data based on the first signal S11 or the second signal S12, or the third signal S13, and the sub-algorithm (STEP 06). On the other hand, in a case where the controller 213 determines that a failure has occurred in the first detector 221 and the second detector 222, or the third detector 223 (YES in STEP 05), the controller 213 ends the present processing without causing the calculation section 2132a to perform the calculation of the electrocardiogram data.

According to the electrocardiogram examination device 210 of the present embodiment, when no failure occurs in any of the detectors, the calculation section 2132a calculates electrocardiogram data based on the main algorithm. On the other hand, for example, when a failure has occurred in the first detector 221, the calculation section 2132a calculates electrocardiogram data based on the sub-algorithm. As described above, even if a failure has occurred in any detectors, the calculator section 2132a can calculate electrocardiogram data. Therefore, the electrocardiogram examination device 210 has failure resistance against a failure of the detector.

The above embodiments are intended to facilitate understanding of the presently disclosed subject matter, and are not intended to limit the presently disclosed subject matter. The presently disclosed subject matter can be modified and improved without departing from the gist thereof.

In the first embodiment, the first light beam and the second light beam are a red light beam, and the third light beam is an infrared light beam. For example, the second light beam may be a red light beam, and the first light beam and the third light beam may be an infrared light beam.

The first wavelength $\lambda 1$ is 660 nm and the second wavelength $\lambda 2$ is 700 nm in the first embodiment and the second embodiment, but the first wavelength $\lambda 1$ may be 700 nm and the second wavelength $\lambda 2$ may be 660 nm.

In the second embodiment, the first light beam and the second light beam are a red light beam, and the third light beam and the fourth light beam are an infrared light beam, and the presently disclosed subject matter is not limited to this example. For example, the first light beam and the second light beam may be an infrared light beam, and the third light beam and the fourth light beam may be a red light beam.

The third wavelength $\lambda 3$ is 940 nm and the fourth wavelength $\lambda 4$ is 880 nm in the second embodiment, but the third wavelength $\lambda 3$ may be 880 nm, and the fourth wavelength $\lambda 4$ may be 940 nm.

The calculation section 132a calculates $SpO_2$ in decimal notation in the first embodiment and the second embodiment, but may calculate $SpO_2$ in percentage notation.

In the first embodiment and the second embodiment, a signal that is not used for the calculation of $SpO_2$ may be used for the calculation of a physiological parameter other than $SpO_2$. For example, in the first embodiment, when no failure occurs in any of the light emitters, the first signal S1 and the third signal S3 may be used for the calculation of the $SpO_2$, and the second signal S2 may be used for the calculation of the value of the carbon monoxide concentration.

In the above-described embodiments, the physiological parameter calculation device (the pulse oximeter 10 and the electrocardiogram examination device 210) includes the display and the notifying section, but may not include the display and the notifying section. In this case, the physiological parameter calculation device may be connected to an external device (for example, a bedside monitor) including a display and a notifying section in a wired or wireless manner.

In the above-described embodiments, the failure sensing sections 12, 212 senses the failure of each element based on the voltage information, but may detect the failure of each element based on the current information. In this case, the physiological parameter calculation device converts a current signal into a voltage signal to generate voltage information, and transmits the voltage information to each element. Each element transmits current information, which is generated based on a current generated when electric energy is converted into light energy, to the acquiring sections 11a, 211a of the physiological parameter calculation device. The failure sensing sections 12, 212 sense a failure of each element based on the received current information and correlation information.

In the above-described embodiments, the controllers 13, 213 generate a failure signal when the failure sensing section 12 senses that a failure has occurred in at least one of the first light emitter 21, the second light emitter 22, and the third light emitter 23, or when the failure sensing section 212 senses that a failure has occurred in at least one of the first detector 221, the second detector 222, and the third detector 223, but the presently disclosed subject matter are not limited to this example. For example, the controller 13 may be configured to generate the failure signal only when the physiological parameter cannot be calculated. In this case, the medical worker can recognize, through the notification of the notifying section 15, that the physiological parameter calculation device is in a state in which the physiological parameter cannot be calculated.

In the above-described embodiments, the functions of the failure sensing sections 12, 212 may be implemented by the processors 132, 2132 of the controllers 13, 213.

STEP 02 is executed after STEP 01 in the first embodiment and the third embodiment, but may be executed simultaneously with STEP 01 or before STEP 01.

STEP 12 is executed after STEP 11 in the second embodiment, but STEP 12 may be executed simultaneously with STEP 11 or before STEP 11.

What is claimed is:

1. A physiological parameter calculation device comprising:
    an acquiring section configured to acquire a plurality of signals corresponding to physiological information of a subject acquired using a plurality of light emitting elements of a sensor, each of the plurality of light emitting elements being configured to emit light that transmits through or reflects from body tissue of the subject;
    a failure sensing section configured to sense a failure of each of the plurality of light emitting elements; and
    a calculation section configured to calculate a physiological parameter based on the plurality of signals acquired by the acquiring section, and a first algorithm or a second algorithm,
    wherein the calculation section calculates the physiological parameter based on the first algorithm when the failure sensing section does not sense a failure in a light emitting element for acquiring a signal used for the first algorithm among the plurality of light emitting elements, and the calculation section calculates the physiological parameter based on the second algorithm when the failure sensing section senses that a failure occurs in the light emitting element for acquiring a signal used for the first algorithm among the plurality of light emitting elements, and
    wherein the failure sensing section detects a failure of the each of the plurality of light emitting elements based on voltage information indicating a voltage value of the each of the plurality of light emitting elements;
    wherein the failure sensing section detects the failure of the each of the plurality of light emitting elements by comparing the voltage value received from the each of the plurality of light emitting elements with an assumed voltage value based on current information indicative of a current transmitted to the plurality of light emitting elements and predetermined correlation information for the each of the plurality of light emitting elements.

2. The physiological parameter calculation device according to claim 1,
    wherein the plurality of light emitting elements at least include:
        a first light emitter configured to emit a first light beam having a first wavelength;
        a second light emitter configured to emit a second light beam having a second wavelength; and
        a third light emitter configured to emit a third light beam having a third wavelength,
    wherein when the failure sensing section senses a failure of the first light emitter, the calculation section calculates the physiological parameter based on a second signal received from the sensor in accordance with an intensity of the second light beam transmitted through or reflected from the body tissue, a third signal received from the sensor in accordance with an intensity of the third light beam transmitted through or reflected from the body tissue, and the second algorithm.

3. The physiological parameter calculation device according to claim 1, wherein the predetermined correlation information for the each of the plurality of light emitting elements is based on materials of the respective light emitting element.

4. A non-transitory computer-readable medium configured to store a computer program causing a computer to implement functions of:
    acquiring a plurality of signals corresponding to physiological information of a subject acquired using a plurality of light emitting elements of a sensor, each of the plurality of light emitting elements being configured to emit light that transmits through or reflects from body tissue of the subject;
    sensing whether there is a failure of each of the plurality of light emitting elements;
    calculating a physiological parameter based on the plurality of the acquired signals and a first algorithm when a failure of a lighting emitting for acquiring a signal used for a first algorithm among the plurality of light emitting elements is not sensed, or calculating the physiological parameter based on the plurality of the acquired signals and a second algorithm when sensing that a failure occurs in the light emitting element for acquiring the signal used for the first algorithm among the plurality of light emitting elements; and
    detecting a failure of the each of the plurality of light emitting elements based on voltage information indicating a voltage value of the each of the plurality of light emitting elements;
    the failure of the each of the plurality of light emitting elements is detected by comparing the voltage value received from the each of the plurality of light emitting elements with an assumed voltage value based on current information indicative of a current transmitted to the plurality of light emitting elements and predetermined correlation information for the each of the plurality of light emitting elements.

5. The non-transitory computer-readable medium according to claim 4, wherein the predetermined correlation information for the each of the plurality of light emitting elements is based on materials of the respective light emitting element.

* * * * *